United States Patent
Sternowski

(10) Patent No.: US 9,316,488 B1
(45) Date of Patent: Apr. 19, 2016

(54) FORCE MEASUREMENT SYSTEM

(71) Applicant: Softronics, Ltd., Marion, IA (US)

(72) Inventor: Robert H. Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

(21) Appl. No.: 14/668,368

(22) Filed: Mar. 25, 2015

Related U.S. Application Data

(60) Provisional application No. 61/975,218, filed on Apr. 4, 2014.

(51) Int. Cl.
*G01B 11/16* (2006.01)
*G01L 1/24* (2006.01)

(52) U.S. Cl.
CPC .. *G01B 11/16* (2013.01); *G01L 1/24* (2013.01)

(58) Field of Classification Search
CPC ....... G01B 11/16; G01L 1/24; B60R 21/0136
See application file for complete search history.

(56) References Cited

U.S. PATENT DOCUMENTS

| | | | | |
|---|---|---|---|---|
| 4,409,842 A * | 10/1983 | Scott et al. | ...................... | 73/800 |
| 4,420,251 A * | 12/1983 | James et al. | ...................... | 356/32 |
| 4,480,480 A * | 11/1984 | Scott et al. | ...................... | 73/769 |
| 4,996,113 A * | 2/1991 | Hector et al. | .................. | 428/600 |
| 5,097,252 A * | 3/1992 | Harvill | .................. | A61B 5/1126 200/DIG. 2 |
| 5,606,137 A * | 2/1997 | Penketh | ..................... | 73/862.324 |
| 5,689,107 A * | 11/1997 | Hsu | ............................ | 250/231.1 |
| 5,844,146 A * | 12/1998 | Murray | .................. | B21D 5/002 73/862.041 |
| 8,917,384 B2 * | 12/2014 | Zhao | .................... | G01B 11/162 356/32 |
| 2003/0173507 A1* | 9/2003 | Paritsky et al. | .......... | 250/227.14 |
| 2004/0129868 A1* | 7/2004 | Kilmartin | ................ | 250/227.14 |
| 2006/0087325 A1* | 4/2006 | Ariav et al. | ..................... | 324/637 |
| 2008/0278336 A1* | 11/2008 | Ortega et al. | .............. | 340/573.5 |
| 2009/0157358 A1* | 6/2009 | Kim | .............................. | 702/185 |
| 2013/0098164 A1* | 4/2013 | Okoli et al. | ..................... | 73/800 |

\* cited by examiner

*Primary Examiner* — Michael A Lyons
*Assistant Examiner* — Maurice Smith
(74) *Attorney, Agent, or Firm* — Jason R. Sytsma; Shuttleworth & Ingersoll, PLC

(57) ABSTRACT

A system includes an emitter of electromagnetic radiation combined to the object and aligned with a detector for detecting the electromagnetic radiation from the emitter. A processor in communication with the detector is calibrated to recognize a change in alignment between the electromagnetic radiation from the emitter and the detector. The processor translates the change in alignment to the amount of force applied to the object.

17 Claims, 4 Drawing Sheets

No load on rail; spot centered

Downward vertical rail load;
Beam moves downward on target

Lateral rail load;
Beam moves leftward on target

Lateral and vertical rail load;
Beam moves left & down on target

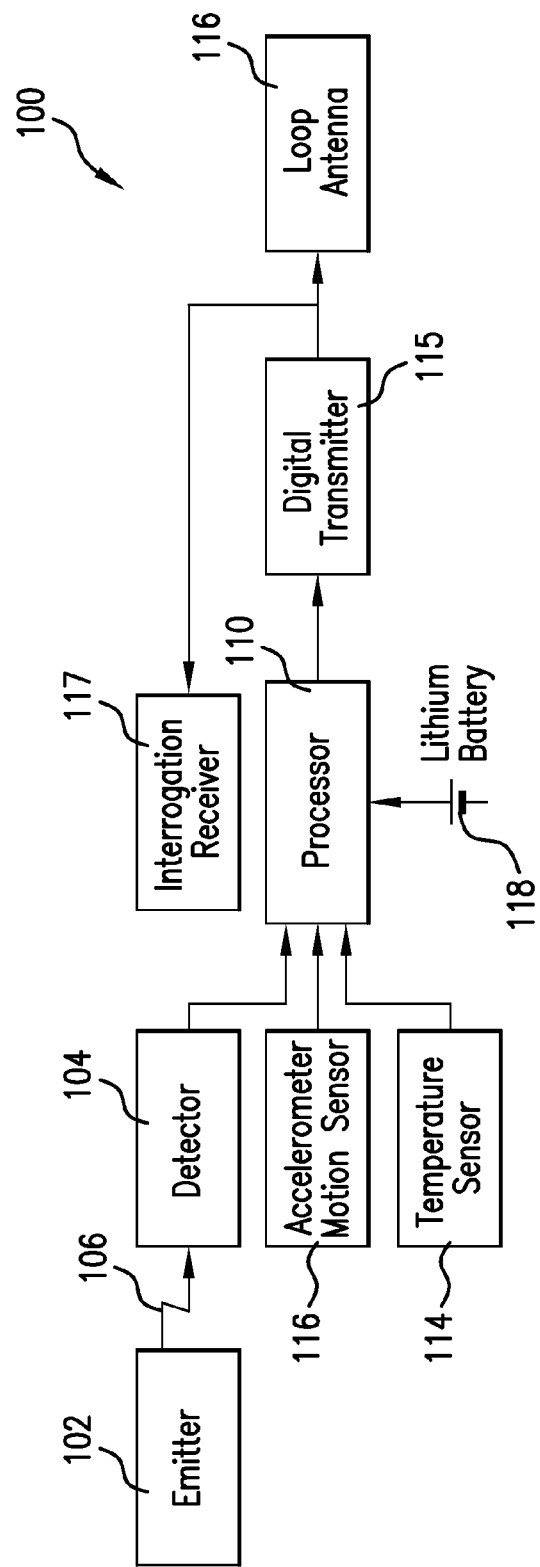

FORCE MEASUREMENT SYSTEM

This application claims priority to U.S. Provisional Application No. 61/975,218 filed Apr. 4, 2014, the entirety of which is hereby incorporated by reference herein.

BACKGROUND

This disclosure relates to a system for measuring the amount of force applied to an object, and more specifically, this disclosure relates to measuring force with an electromagnetic radiation load measurement system.

Sensors for detecting the amount of force applied to an object are critical for determining the object's useful life. When the object is a beam or girder of a building, bridge, or other structure, or a rail of a railroad track, knowing the amount of time the object has before it is fails is absolutely safety critical.

Measuring the useful life of a rail, for example, has traditionally been a difficult measurement. The two most common problems rails face are metal fatigue leading to structural failure and derailments, and out-of-round defects in wheels which accelerate other fatigue failures due to constant increased vibration. The problem with measuring these forces is the huge load forces, the traveling load (with the rolling of the train wheels at up to 72 mph or more), and geometry of the rail and wheel combination.

Numerous strain gage and load cell solutions, both on the rail car wheel/axle assembly and on the track, have been attempted with various degrees of success and accuracy. These sensors produce a varying voltage (by several different means) proportional to a bending moment or a compression force. Most of the solutions are quite expensive, requiring special trucks on the rail cars, special sections of rail being installed, welding or drilling sensors into rails, etc. This has prevented widespread proliferation of such sensors.

SUMMARY

A system for measuring an amount of force applied to an object is disclosed. The system includes an emitter of electromagnetic radiation combined to the object and aligned with a detector for detecting the electromagnetic radiation from the emitter. A processor in communication with the detector is calibrated to recognize a change in alignment between the electromagnetic radiation from the emitter and the detector. The processor translates the change in alignment to the amount of force applied to the object.

The emitter and the detector can be mounted to a support member, such as a printed circuit board, to maintain the alignment of the each. The support member can then be attached to the object. Weight from a load on the object will cause the detector to deflect and the point of contact of the electromagnetic radiation on the detector will move. This movement causes a change in alignment, which can then be used to calculate the amount of force applied to the object.

Other sensors can be combined with the processor to provide an indication of the environment of the object, such as an accelerometer, and a temperature sensor. The total information about the environment can then be transmitted wirelessly by an antenna to an external receiver for further analysis.

Further aspects and examples of embodiments of at least one invention described herein will be made apparent in the following Detailed Description and the appended claims.

BRIEF DESCRIPTION OF THE DRAWINGS

FIG. 4 is a block diagram of the force measurement system.

DETAILED DESCRIPTION

Disclosed is a force measurement system 100 (shown in FIG. 4) to measure the force on an object 10 that is very low in both procurement cost and installation cost, thus allowing widespread monitoring to improve safety. The illustrated object 10 is directed to an embodiment where object 10 is a rail of a railroad track; however, object 10 can be any structural member in buildings, bridges, vehicles, aircraft wing spars, crane booms, etc.—anywhere metal fatigue is a concern over service life.

Figure 1A:
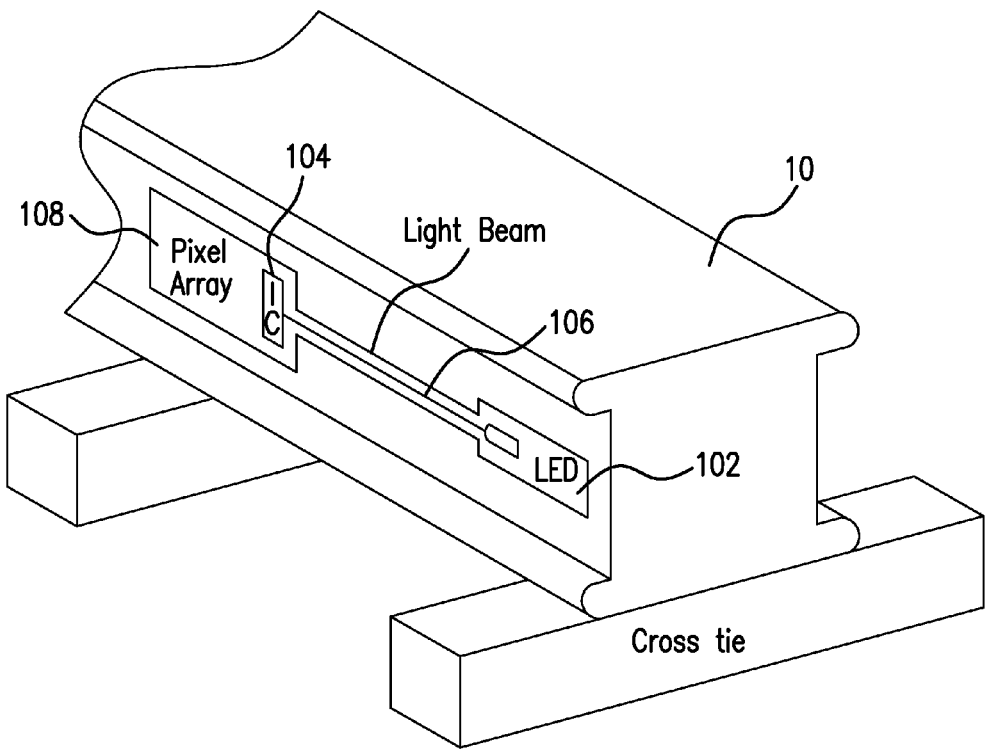
FIG. 1A is a block diagram of a force measurement system according to an embodiment of this disclosure.
Figure 1B:
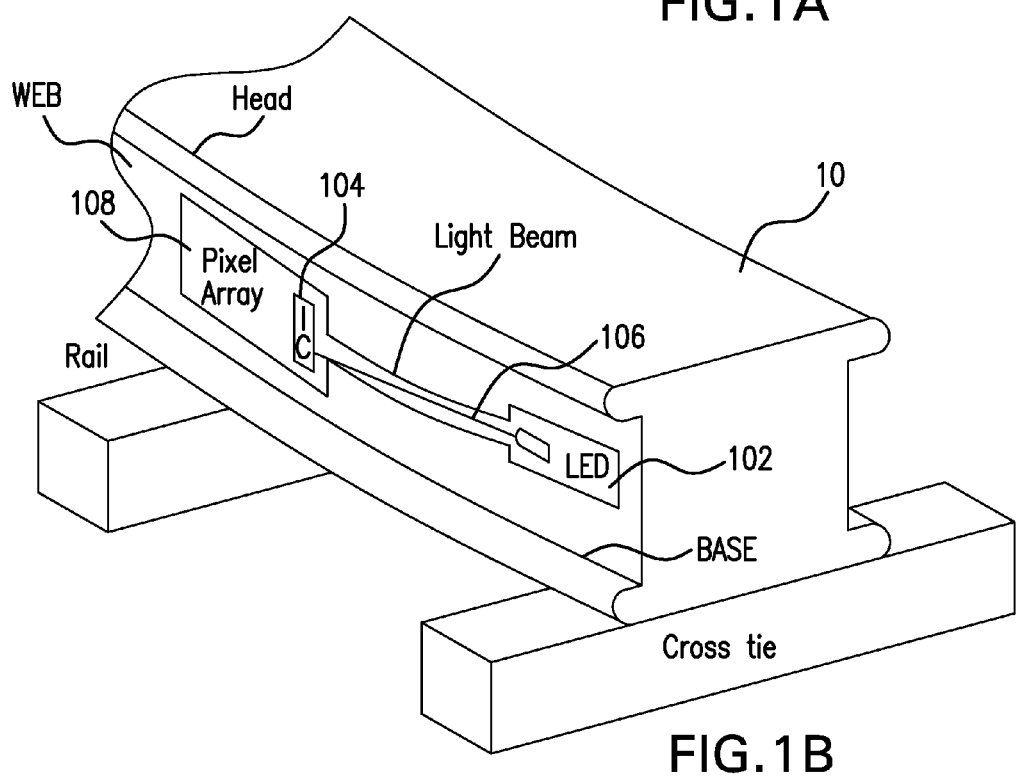
FIG. 1B is the block diagram of the force measurement system of FIG. 1A with load deflection.

A high level block diagram of an emitter 102 and detector 104 of force measurement system 100 is shown in FIGS. 1A and 1B. Emitter 102 emits electromagnetic radiation 106 toward detector 104. In an embodiment, emitter 102 can be a light emitting diode (LED) that emits electromagnetic radiation 106 in the form of a narrow beam of light and detector 104 can be a pixel array target of light-sensitive electronic components, such as an image sensor, a video camera, or the like. Both can be constructed with any of a variety of materials and components, such as an integrated circuit with many linearly spaced elements and onboard processing circuitry.

Emitter 102 and detector 104 are attached to a common support member 108 that is attached to object 10 to maintain an alignment with emitter 102 and detector 104 in the proper position, so that electromagnetic radiation 106 is nominally centered toward its target on detector 104. Support member 108 can be a common carrier board, e.g. a printed circuit board that also carries electrical connections. Support member 108 can be rigidly fastened or fixed to object 10 using any variety of mechanical means or substances.

FIGS. 2A-2D are exaggerated illustrations of detector 104 of a pixel array target and electromagnetic radiation 106 in the form of a light beam. As a force is applied to object 10, object 10 will deflect downward, for example as a rail car wheel rolls on the rail (see FIG. 2B). The point of maximum deflection occurs directly under the contact patch of the rail/wheel (i.e. the load). When that contact patch is directly in the center point on the rail between the light beam and detector 104, object 10 between the light beam and detector 104 will curve downward, causing the projected light beam from emitter 102 to move downward on the target. The downward deflection will increase as the wheel approaches the center point, and decrease (and return to "home" no load position) as the wheel rolls past the center point. Thus the light beam movement is proportional to the vertical force load applied by the rail car wheel.

Figure 2A:
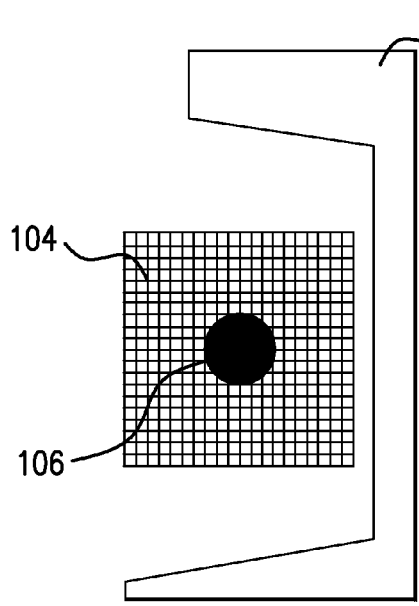
FIG. 2A illustrates the target and image versus the object in accordance with the embodiment of FIG. 1A, with the image in a center position
Figure 2B:
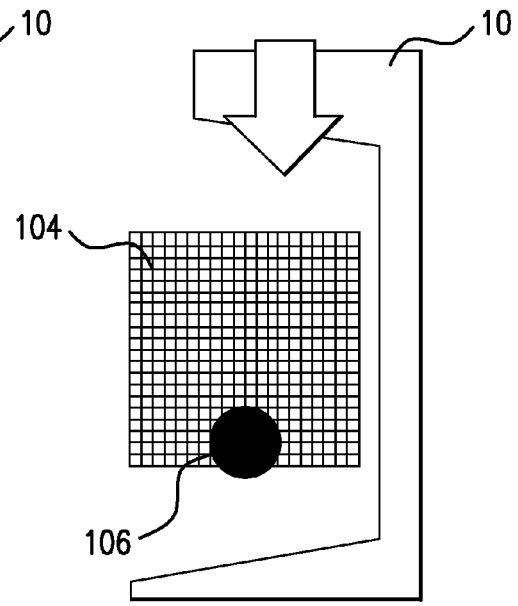
FIG. 2B illustrates the target and image versus the object in accordance with the embodiment of FIG. 1A, with the image below center.
Figure 2C:
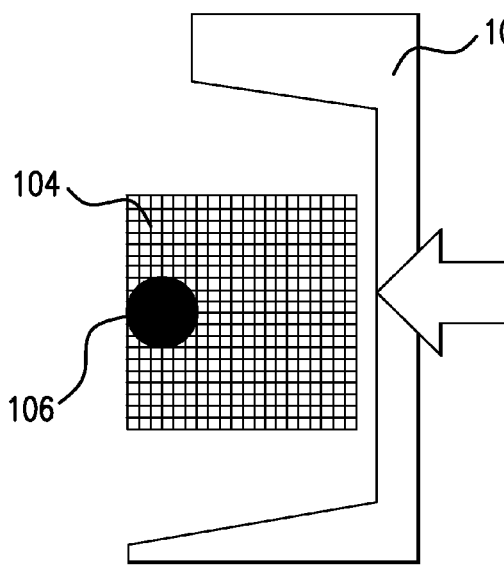
FIG. 2C illustrates the target and image versus the object in accordance with the embodiment of FIG. 1A, with the image left of center.
Figure 2D:
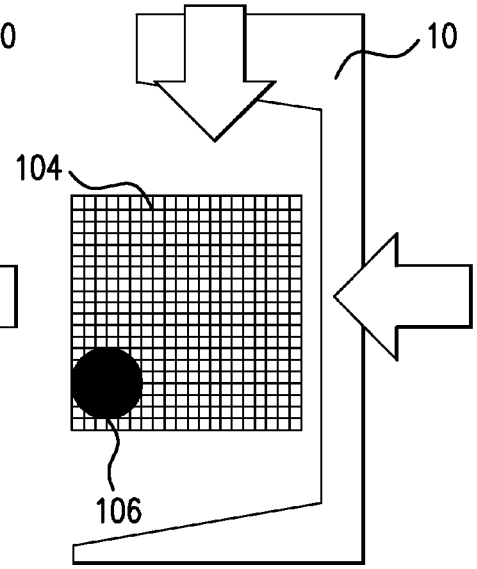
FIG. 2D illustrates the target and image versus the object in accordance with the embodiment of FIG. 1A, with the image right of center.

The light beam is treated as an image; it does not need to be a very narrow beam that illuminates only one pixel (however, that is an anticipated and equally viable variation of this method). More than one illuminated pixel, e.g., a pattern of pixel illumination with the illumination of each pixel varying independently, constitutes an image. Image processing software, operating on processor 110 may then discern and identify that pattern. If that entire pattern shifts position (as shown in FIGS. 2B-2D with respect to 2A), as when the rail is deflected and the straight-line light beam strikes detector 104 in a different location, image processing software will determine that the entire image has moved, and how many pixels it has moved in the horizontal and vertical directions. The number of pixels of movement may be multiplied by the calibration factor of object 10 to determine the absolute force applied to object 10 to cause that amount of deflection. Furthermore, different load force versions with different target/source spacing can be programmed according to the force being measured and the resulting structural deflection of object 10.

Given that the type of rail is of a known type and characteristic, the amount of force (in units of tons, kilo-Newtons, etc.) to deflect the rail, one pixel resolution, may be measured or computed. A complete range of pixel vs force calibration curves may be constructed for each type of rail and light source/array spacing. In this way, force measurement system 100 may measure the absolute force applied to object 10 by noting the deflection from the no-load position as a wheel passes over it. A processor 110 can include non-volatile memory for long-term data-logging to capture each pulse created by a rolling wheel passing over the measurement point. This allows determining the total load life of object 10 by considering the sum of all load pulses which cumulatively lead to metal fatigue.

Figure 3:
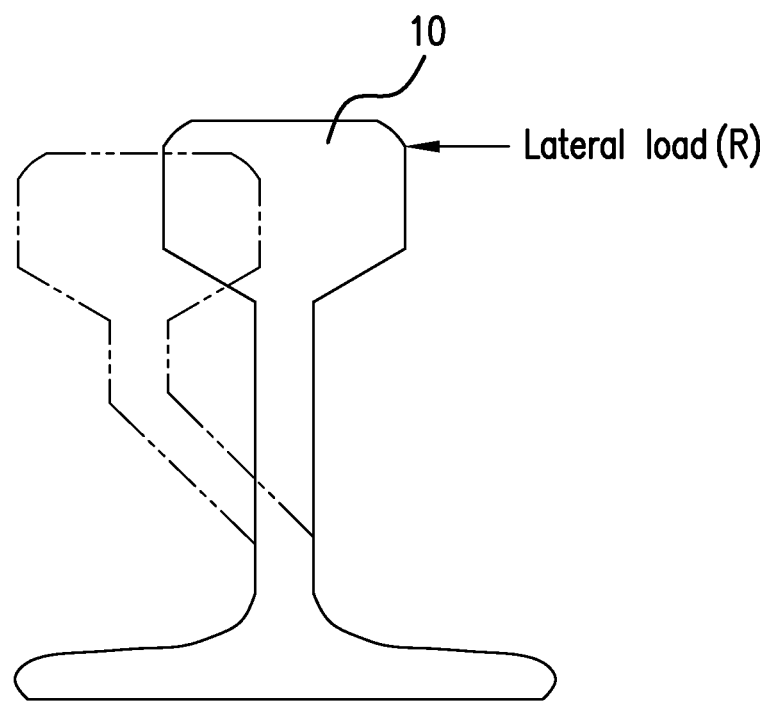
FIG. 3 shows an exaggerated view of how an object deflects laterally as a load passes over it.

Force measurement system 100 has the advantage of simultaneously being able to measure lateral force, simply by measuring the spot displacement in the horizontal direction in the similar manner. A separate calibration table is required for the lateral rail deflection, as the structural aspects differ. FIG. 3 shows the deflection of object 10 due to a lateral load. FIGS. 2A and 2D show the movement of the light beam leftward or rightward with respect to detector 10 corresponding to lateral movement of object 10. Lateral forces also cause metal fatigue where object 10 is curved to as to alter direction. The curvature causes centripetal force which causes the load (i.e. rail car wheels) to push outward away from the center of curvature as the train rounds a track curve. This is also a safety issue due to metal fatigue with continuous use. Given that both vertical and lateral movement can be measured, calculating Torque due to the lateral force can also be derived.

FIG. 4 shows force measurement system 100. Emitter 102 emits electromagnetic radiation 106 toward detector 104 (as also shown in FIGS. 1A, 1B). Processor 110 logs the data and analyzes the pixel array pattern of detector 104 to track the motion of the pixel pattern with respect to the light source beam (electromagnetic radiation 106). The signal along with any other information such as location (from an embedded identification code), temperature (from a temperature sensor 114), and acceleration (from an accelerometer or motion sensor 116) are digitized and transmitted by digital processor 115 and broadcast by an antenna 116 to a receiver for review. This allows for wireless upload of collected data via transmission by antenna 116. Alternatively a connectable interrogation receiver 117 can be used for manual download of the data. Force measurement system 100 can be powered by a power source 118 that is a small lithium battery with a long life to provide reliable operation over the useful life of object 10.

Force measurement system 100 can accommodate movement of emitter 102 or detector 104 over time. It is not necessary for the whole light beam to remain on the target. Image processing software in processor 110 can recognize the portion of the light beam that remains on the target and determine the motion of detector 102 from the no load position. Drift of the no load position is handled by considering that the loads to be measured rapidly change over a large magnitude. The average position of the slowly drifting no-load beam may be easily determined, as is the fast-changing load pulse.

Force measurement system 100 can gather long-term measurements of force pulses. Because the force measurement system 100 has virtually unlimited measurement bandwidth, force measurement system 100 functions at near speed of light. Force measurement system 100 with a high speed data logger can characterize the dynamic time-varying load "bounce" as each wheel of a long train passes over a point on load 10.

Force measurement system 100, in one implementation, can incorporate detector 104 on an integrated circuit with a 20×20 pixel array and complete signal processing firmware embedded in a processor 110 that can directly supply the X- and Y-deflection in pixels. Such integrated circuits can determine the X-Y motion up to 3000 times per second or more, allowing very fine measurements to be made. A commensurately low cost emitter 102 would be an LED with a pin hole or optical lens to produce a small spot size on the integrated circuit containing detector 104. Pixels on the target array can be 60 to 75 microns square.

The simplicity of installation and low parts cost permit mass proliferation of force measurement system 100 for many safety applications with the added benefit of no wear out mechanism, unlike with load cells and strain gages.

In other embodiments, force measurement system 100 can also be used on a wheel to detect defects by sensing a constant vibration frequency with a Fourier analysis of the output data.

In yet another embodiment, force measurement system 100 can use emitter 102 to bounce electromagnetic radiation 106 off a grid on a highly reflective surface. As the grid moves from the weight of the force or load, electromagnetic radiation 106 is interrupted by the grid and detector 104 detects the interruptions.

Reference has been made to several components throughout this disclosure as though each component is a unique component. One skilled in the art will readily recognize, however, that the various sensors, transmitters, and processors can be incorporated into one or more other sensors, transmitters, and processors thereby reducing the number of components.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations could be made herein without departing from the spirit and scope of the invention as embodied by the appended claims and their equivalents.

What is claimed is:

1. A force measurement system for measuring an amount of force applied to an object, the system comprising:
   a light source combined to the object for emitting electromagnetic radiation;

a detector combined to the object and aligned with the light source for detecting the electromagnetic radiation from the light source; and a processor in communication with the detector calibrated for recognizing a change in alignment of the detector and the light source and translating the change in alignment to the amount of force applied to the object.

2. The system of claim 1, and further comprising a support member attached to the object, wherein the light source and the detector are attached to the support member to maintain the alignment between the light source and the detector.

3. The system of claim 2, wherein the support member is a circuit board, and wherein the circuit board is fixed to the object.

4. The system of claim 1, wherein the light source is a light emitting diode (LED) for emitting light and the detector is directly aligned with the LED.

5. The system of claim 4, wherein the detector is an array of photodiodes and the processor translates a movement of light on the array of photodiodes to the amount of force applied to the object.

6. The system of claim 1, wherein the detector is an image sensor with a plurality of pixels, and the processor translates movement of the electromagnetic radiation across the plurality of pixels and a calibration factor to the amount of force applied to the object.

7. The system of claim 6, wherein the electromagnetic radiation moves across the image sensor.

8. The system of claim 1, and further comprising a digital transmitter to convert an analog signal from the processor to a digital signal and an antenna to transmit information from the digital transmitter.

9. The system of claim 1, wherein the processor further comprises a data-logger to capture each pulse created by a load passing over the object.

10. The system of claim 1, and further comprising at least one chosen from an accelerometer and a temperature sensor, in communication with the processor.

11. A force measurement system for measuring an amount of force applied to an object, the system comprising:

a light emitting diode combined to the object for emitting light;

an image sensor combined to the object and aligned with the light emitting diode for detecting the light from the light emitting diode;

a processor in communication with the image sensor calibrated for recognizing a change in alignment between light emitting diode and the image sensor and translating the change in alignment to the amount of force applied to the object.

12. The system of claim 11, and further comprising a circuit board attached to the object and the light emitting diode and the image sensor are attached to the circuit board.

13. The system of claim 11, wherein the processor further comprises a data-logger to capture each pulse created by a load passing over the object.

14. The system of claim 11, and further comprising at least one chosen from an accelerometer and a temperature sensor, in communication with the processor.

15. The system of claim 11, and further comprising a digital transmitter to convert an analog signal from the processor to a digital signal and an antenna to transmit information from the digital transmitter.

16. A force measurement system for measuring an amount of force applied to an object, the system comprising:

a light source combined to the object for emitting light;

a detector with a plurality of pixels combined to the object and directly aligned with the light source for detecting the light from the light source;

a processor in communication with the image sensor calibrated for recognizing a change in alignment between the light source and the detector and translating a movement of the light across the plurality of pixels to the amount of force applied to the object; and a circuit board attached to the object and the light source and the detector are attached to the circuit board and positioned such that the light source is aligned with the detector for emitting light directly to the detector.

17. The system of claim 16, wherein a calculation of the force is determined upon a number of pixels across which the light moves multiplied by a calibration factor, wherein the detector and the light source are directly aligned.

* * * * *